Figure 1:
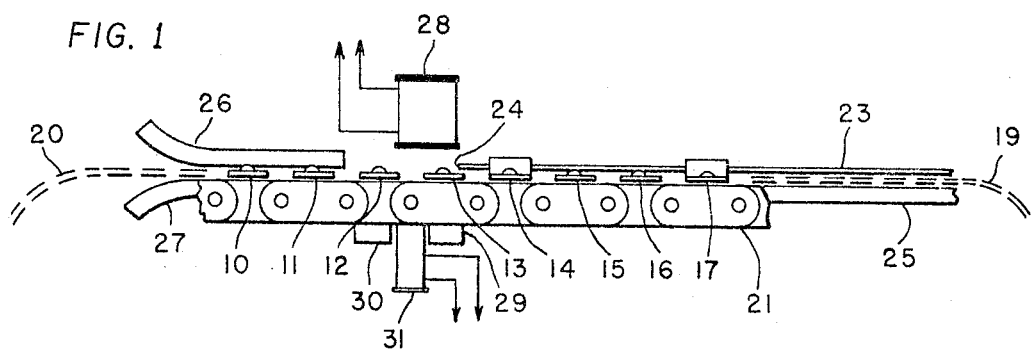

Sept. 13, 1966   J. W. DAVIS   3,273,132

MECHANICAL SPRING FINGER DATA STORAGE SYSTEM

Original Filed Aug. 21, 1961

INVENTOR.
JOSEPH W. DAVIS
BY
Alfred Stapler
ATTORNEY

United States Patent Office 3,273,132
Patented Sept. 13, 1966

3,273,132
MECHANICAL SPRING FINGER DATA STORAGE SYSTEM
Joseph W. Davis, Chester Heights, Pa., assignor to General Atronics Corporation, Wyndmoor, Pa., a corporation of Pennsylvania
Continuation of application Ser. No. 132,880, Aug. 21, 1961. This application Dec. 9, 1964, Ser. No. 418,947
2 Claims. (Cl. 340—173)

This invention relates to improvements in data storage systems of the type in which the stored data are represented by the position of spring fingers on one side or the other of a barrier along which these spring fingers travel, the instant application being a continuation of application Ser. No. 132,880, filed August 21, 1961, now abandoned.

In such a system the above-mentioned barrier extends along a portion of an endless path traveled by the spring fingers. This barrier is positioned relative to said path so that, when the spring fingers are undeflected, they tend to travel along one side of the barrier. At the leading edge of the barrier there is stationed an electro-magnet which is energizable to deflect selected ones of these spring fingers so that they will pass this leading edge on the side opposite to that on which they would normally pass it. Thereafter the barrier prevents these deflected spring fingers from returning to their undeflected positions and constrains them to travel along the side of the barrier opposite to that which they would follow in their undeflected condition. The pattern of deflected and undeflected fingers thus produced represents the data being stored. By disposing, at one or more points along the barrier, apparatus capable of sensing the passage of spring fingers along one side or the other of this barrier, the stored data may be recovered after a storage interval dependent upon the speed of movement of the fingers along the barrier and the distance between its leading edge and the sensing apparatus. Since deflection of the spring fingers, as described above, places these fingers under tension, the deflected fingers tend to return to their undeflected positions at the end of their travel along the barrier. This in effect erases the data stored by means of the deflected spring fingers and puts them in a condition in which new data can be stored by means of them as they pass the leading edge of the barrier again in their next circuit around the endless path in which they travel.

A storage system of this type has many uses. For example, it may be used as a proportional memory for a material transporting conveyor. In this application the spring fingers are caused to travel along the barrier in synchronism with the travel of the conveyor from its loading station to one or more discharge stations. Different destination codes may be impressed on the one finger or group of fingers representing a given conveyor section by positioning these fingers to one side or the other of the barrier in different patterns. Apparatus sensitive to these different patterns is then disposed along the barrier at different positions corresponding, respectively, to the various discharge stations of the conveyor and sensing by such apparatus of the particular pattern to which it is sensitive is utilized to cause discharge of the conveyor section represented by the fingers disposed in this pattern.

In the type of data storage system under consideration it is necessary that the undeflected fingers travel in very close proximity to, and in fact preferably in contact with, the barrier. This makes it possible to deflect the spring fingers to the opposite side of the barrier with a minimum of physical displacement, thus reducing the size and power requirements of the deflecting means and also the danger that the spring fingers will be deflected beyond their elastic limits. However, this close spacing creates the following problem. In the course of operation of the system it is possible for the undeflected spring fingers to acquire slight unintended deflections from their desired undeflected positions. This may result from repeated intentional deflections or from a variety of other causes. Because of the close spacings discussed above, spring fingers which have such slight unintended deflections may become caught on the leading edge of the barrier and may be misdirected to the wrong side of the barrier or even become arrested by the barrier, causing the whole system to jam or the fingers to break. These mishaps cannot be prevented by purely mechanical channeling means because such channeling means must necessarily stop short of the leading edge of the barrier in order to provide an unconfined space in which the spring fingers can be intentionally deflected from one side of the barrier to the other.

Accordingly, it is the object of the invention to overcome the defects outlined above and to provide a data storage system of the type under discussion in which there is no substantial possibility of malfunction due to misalignment of the spring fingers approaching the leading edge of the barrier.

This object is achieved by providing, in addition to the electro-magnet which is energizable to deflect selected ones of the spring fingers from one side of the barrier to the other, an auxiliary magnet which produces a force opposing the deflection produced by the electro-magnet. The auxiliary magnet is so arranged that it is unable to overcome the deflecting force produced by the electro-magnet when the latter is energized, but is able to bring unintentially deflected spring fingers back into their desired undeflected positions when the electro-magnet is not energized.

Figure 2:
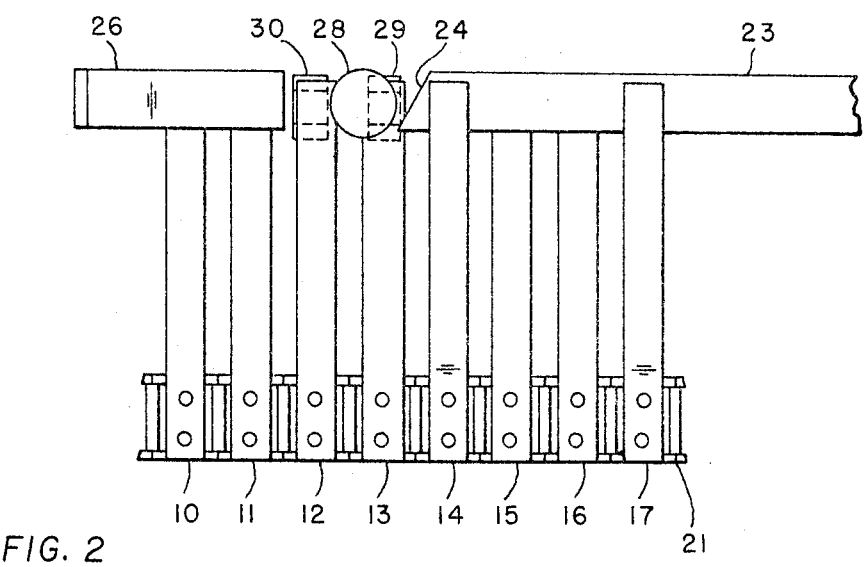

Further details are provided below with reference to the accompanying drawings in which FIGURE 1 shows that portion of the type of data storage system under discussion which embodies the invention, and FIGURE 2 is a top view of the apparatus shown in FIGURE 1.

Referring now to these figures, both illustrate that portion of a data storage system of the type under discussion in which the transfer of the spring fingers from one side to another of the barrier is accomplished. Eight spring fingers 10 through 17 are shown, but it will be understood that additional spring fingers may be present both to the right and the left of those illustrated as indicated diagrammatically by the pairs of broken lines 19 and 20 extending to the right and left of the spring fingers in FIGURE 1. As shown in FIGURE 2, each spring finger is riveted at one end to a link in a chain 21. This chain may be driven in any conventional manner to cause the spring fingers to move from left to right, i.e. in the direction indicated by arrow 22 in the drawings. Chain 21 preferably forms an endless loop so that the spring fingers recirculate repeatedly through the region illustrated in the drawings.

A section of the barrier forming part of the storage system is shown at 23 in FIGURES 1 and 2. This barrier has a leading edge 24 which is preferably wedge-shaped in the horizontal plane, as shown in FIGURE 2. When the spring fingers are undeflected, their free ends travel along a path immediately adjacent the lower edge of barrier 23. Fingers 13 and 16 are shown in that position in FIGURES 1 and 2. A guide strip 25, although not essential, is preferably provided below barrier 23, spaced from its lower edge by about the thickness of the spring fingers, for the purpose of keeping to a minimum unintentional deviations of the spring fingers from their desired path along the lower edge of barrier 23. Also preferably included is a pair of converging rails 26 and 27 which end some distance to the left of the leading edge 24 of barrier 23 and which, at their closest approach to said barrier, are aligned with its leading edge and with the adjacent end of guide strip 25, respectively. Spring fingers approaching the barrier 23 are constrained to pass between these converging rails which tend to reduce unintended displacements of these fingers from their desired approach path to the barrier. Above the gap between rail 26 and the leading edge 24 of barrier 23 is an electro-magnet 28 which is energizable simultaneously with the passage of selected spring fingers beneath it and responds to such energization to attract these spring fingers to itself, thereby lifting them above barrier 23. This energization continues until the affected finger has become engaged by the upper edge of barrier 23 which thereafter prevents it from returning to its undeflected position in its further travel along the barrier. Fingers 14 and 17 are shown in this deflected position in FIGURES 1 and 2. Electromagnet 28 may be energized in any one of various conventional ways which form no part of the invention and which are therefore not discussed further.

Any sensing apparatus which may be disposed along barrier 23 for detecting the passage of spring fingers above and below this barrier also forms no part of the present invention. In view of this, and in view of the fact that various forms of such sensing apparatus are known, this apparatus is also not discussed further herein.

In accordance with the present invention there is provided, in addition to electro-magnet 28, an auxiliary magnet 29, positioned below the plane defined by the lower edge of barrier 23 and in such relation to the paths of the spring fingers that it begins to act on each one of them only after this finger has entered the region in which it is subject to the influence of electro-magnet 28, provided the latter is energized. The top surface of auxiliary magnet 29 is level with the top surface of guide strip 25 which defines the lower limit of the path intended to be followed by the undeflected spring fingers in relation to barrier 23. The strength of the auxiliary magnet, which may be either a permanent magnet, or an electro-magnet energized continuously during operation of the storage system, is proportioned relative to that of electro-magnet 28 in such a way that it is unable to overcome the attraction exerted on the spring fingers by the energized electromagnet 28. Consequently the presence of the auxiliary magnet does not interfere with the ability of electro-magnet 28 to displace selected spring fingers to the top of the barrier. However, if the electro-magnet 28 is not energized, then auxiliary magnet 29 will be effective to keep the spring fingers approaching barrier 23 below the lower edge of the barrier during passage of its leading edge 24, even though these finges may previously have been unintentionally displaced so that, in the absence of the magnet 29, they would approach the barrier with a sufficient upward deflection to become caught on its leading edge.

In the preferred embodiment illustrated in FIGURES 1 and 2 there is also provided a second auxiliary magnet 30, which may be similar to auxiliary magnet 29 in its magnetic characteristic and which is disposed in the path of the spring fingers ahead of the region in which they are susceptible of being affected by the electro-magnet 28. The top surface of this second auxiliary magnet 30 is preferably aligned with the top surfaces of rail 27 and auxiliary magnet 29. Magnet 30 attracts to its top surface spring fingers passing above it before they enter the region in which electro-magnet 28 is able to affect them, thereby contributing, whenever electro-magnet 28 is unenergized, to the smooth transition of the spring fingers to the top surface of auxiliary magnet 29.

Various modifications of the apparatus described above will readily occur to those skilled in the art without departing from the inventive concept. For example, a second electro-magnet 31, shown in FIGURE 1, may be positioned in the gap between auxiliary magnets 29 and 30. This second electro-magnet is energized whenever electro-magnet 28 is not energized and vice-versa. Thus, whenever electro-magnet 28 is unenergized, electro-magnet 31 provides for a smooth transition of the fingers from permanent magnet 29 to permanent magnet 30 thereby facilitating still more the proper positioning of the undeflected spring fingers below the lower edge of barrier 23.

I claim:

1. In a data storage system including a barrier, a plurality of deflectable spring fingers moving in their undeflected positions along said barrier adjacent one side thereof, and electro-magnetic means energizable to deflect selected ones of said spring fingers at the beginning of their movement along said barrier so as to cause them to move adjacent the opposite side of said barrier, the improvement comprising auxiliary magnetic means opposing said deflection produced by said electro-magnetic means, said auxiliary magnetic means having insufficient strength to counteract the deflection produced by said electro-magnetic means and comprising a first magnet positioned so that any one of said moving spring fingers becomes subject to the substantial influence of said magnet after it has become subject to the influence of said electro-magnet, and a second magnet so positioned that any one of said moving spring fingers traverses the region in which it is subject to the influence of said second magnet before becoming subject to the substantial influence of said electro-magnet.

2. In a data storage system including a barrier, a plurality of deflectable spring fingers movable in their undeflected positions along said barrier adjacent one side thereof, and electro-magnetic means energizable to deflect selected ones of said spring fingers at the beginning of their movement along said barrier so as to cause them to move adjacent the opposite side of said barrier, the improvement comprising first and second auxiliary magnetic means, each opposing said deflection produced by said electro-magnetic means, said first auxiliary means comprising a magnet having insufficient strength to counteract the deflection produced by said electro-magnetic means and positioned so that any one of said moving spring fingers becomes subject to the influence of said magnet after it has become subject to the influence of said electro-magnet and a second magnet so positioned that any one of said moving spring fingers traverses the region in which it is subject to the influence of said second magnet before becoming subject to the influence of said energized electro-magnet, and said second auxiliary means comprising a second electro-magnet disposed between said first and second magnets, said second electro-magnet being energizable alternately with said first-mentioned electro-magnet.

References Cited by the Examiner

UNITED STATES PATENTS

| | | | |
|---|---|---|---|
| 420,622 | 2/1890 | Dickerson | 317—188 |
| 2,431,125 | 11/1947 | Klaus | 324—103 |
| 2,604,524 | 7/1952 | McCaine | 317—188 |
| 2,817,796 | 12/1956 | De Fligue | 317—172 |
| 2,827,529 | 3/1958 | De Fligue | 200—93 |
| 2,861,145 | 11/1958 | Gardiner | 317—188 |

BERNARD KONICK, *Primary Examiner.*

IRVING L. SRAGOW, *Examiner.*

T. W. FEARS, *Assistant Examiner.*